United States Patent [19]

Lewis

[11] Patent Number: 6,115,820

[45] Date of Patent: Sep. 5, 2000

[54] DETERMINING THEFT OF GRAMMAR CODE

[75] Inventor: James R. Lewis, Delray Beach, Fla.

[73] Assignee: International Business Machines Corporation, Armonk, N.Y.

[21] Appl. No.: 09/088,540

[22] Filed: Jun. 1, 1998

[51] Int. Cl.$^7$ .................................................. G06F 12/14
[52] U.S. Cl. ............................................ 713/200; 380/4
[58] Field of Search ................................. 713/200, 201, 713/202; 340/825.34, 825.31; 380/3, 4, 19, 23, 24, 25, 28; 704/275, 270, 235; 379/88, 188

[56] References Cited

U.S. PATENT DOCUMENTS

| | | | |
|---|---|---|---|
| 4,683,968 | 8/1987 | Appelbaum et al. | 380/4 |
| 5,191,611 | 3/1993 | Lang | 380/25 |
| 5,287,407 | 2/1994 | Holmes | 380/4 |
| 5,388,211 | 2/1995 | Hornbuckle | 395/200 |
| 5,608,784 | 3/1997 | Miller | 379/88 |
| 5,613,089 | 3/1997 | Hornbuckle | 395/491 |
| 5,630,057 | 5/1997 | Hait | 395/186 |
| 5,649,187 | 7/1997 | Hornbuckle | 395/610 |
| 5,950,167 | 9/1999 | Yaker | 704/275 |
| 6,006,328 | 12/1999 | Drake | 713/200 |

*Primary Examiner*—Nadeem Iqbal
*Attorney, Agent, or Firm*—Quarles & Brady LLP

[57] ABSTRACT

A method for programming a grammar code for a speech-enabled computer program, comprising the steps of: enabling a plurality of natural command grammars containing respective representations of valid expressions for said speech-enabled computer program; providing as one of said valid expressions a plurality of ordered words virtually certain not to be uttered by someone not already aware of said plurality of ordered words; and, causing said program to automatically initiate a perceptible action in response to recognition of said plurality of ordered words. The method can further comprise the step of providing translation rules for said plurality of command grammars, wherein speech recognition of said plurality of ordered words invokes one of said translation rules, said invoked one of said translation rules initiating said perceptible action. The action can be activation of a predetermined printer function, displaying a predetermined message on a display device and printing a predetermined message.

11 Claims, 2 Drawing Sheets

```
<<root>> = <sentence1>
         | <sentence2>
         | <sentence3>
```

FIG. 1

```
<sentence2>=PRINT THE NEXT PAGE          ->print (page, next)

<sentence2>=PRINT THE PREVIOUS PAGE  -   ->print (page, previous)

<sentence2>=PRINT THE PREVIOUS SECTION   ->print (section, previous)
```

FIG. 2

```
<sentence1> = PRINT THE NEXT PAGE                              ->print (page,next)

| I STOLE THIS GRAMMAR AND ALL I GOT WAS A LOUSY T SHIRT       ->print (page,next)
```

FIG. 3

DETERMINING THEFT OF GRAMMAR CODE

BACKGROUND OF THE INVENTION

1. Field of the Invention

This invention relates generally to the field of inhibiting theft of computer programs, and in particular, to a method for determining theft of grammar code in speech enabled computer programs.

2. Description of Related Art

It is extremely difficult, if not impossible, to determine if a competitor has illegally copied, renamed and/or used grammar code developed by another company.

In the rapidly emerging field of speech enabled systems, encoded command grammars are becoming common. While simple grammars are relatively easy to develop, and are therefore of little value to the developing company, more complex grammars, including natural language and natural command grammars, are very difficult to develop. Such natural language and command grammars are therefore quite valuable.

It is fairly easy to determine if a competitor has illegally copied and reused a simple grammar simply by checking the file size and exhaustively testing the grammar to see if the grammar accepts all and only the valid commands from the original grammar. In many cases, these types of grammars have a very limited number of valid command, so exhaustive testing is feasible. It must be noted, however, that even if exhaustive testing shows the suspect grammar to have the same input/output properties as the original grammar, the testing has not conclusively proven theft.

For natural command grammars, though, the number of valid commands is for all practical purposes infinite, precluding exhaustive testing as a method for indicating even the possibility of theft. There is a pressing need for a simple method for conclusively determining theft of natural language and command grammars.

SUMMARY OF THE INVENTION

In accordance with the inventive arrangements, a secret phase is coded into the grammar so that the phrase and its consequence are known only to the developer. In order to test a grammar suspected of being stolen, one need only utter the secret phrase for speech recognition by the suspect product and see if the system recognizes the phrase and performs the secret action.

A method for determining theft of grammar code, the grammar code having a plurality of natural command grammars containing representations of valid expressions for a speech-enabled computer program, in accordance with an inventive arrangement, comprises the steps of: adding a valid test expression to the program, the test expression including words virtually certain not to be uttered by someone not already aware of the test expression; and, causing the program to automatically initiate a perceptible action in response to recognition of the test expression.

The method can further comprise the step of uttering the test expression for recognition by a speech recognition program suspected of being a copy of the computer program.

The action can be activation of a predetermined printer function, displaying a predetermined message on a display device and/or printing a predetermined message.

A method for programming a grammar code for a speech-enabled computer program, in accordance with another inventive arrangement, comprises the steps of: enabling a plurality of natural command grammars containing respective representations of valid expressions for the speech-enabled computer program; providing as one of the valid expressions a plurality of ordered words virtually certain not to be uttered by someone not already aware of the plurality of ordered words; and, causing the program to automatically initiate a perceptible action in response to recognition of the plurality of ordered words.

The action can be activation of a predetermined printer function, displaying a predetermined message on a display device and/or printing a predetermined message.

The method can further comprise the step of providing translation rules for the plurality of command grammars. Speech recognition of the plurality of ordered words invokes one of the translation rules, the invoked one of the translation rules initiating the perceptible action.

BRIEF DESCRIPTION OF THE DRAWINGS

FIG. 1 illustrates valid expressions in BNF grammar for a speech enabled program.

FIG. 2 illustrates several valid grammar code expressions defining the root shown in FIG. 1.

FIG. 3 illustrates how one of the grammar code expressions of FIG. 2 can be modified to include a secret phrase in accordance with the inventive arrangements.

DETAILED DESCRIPTION OF THE PREFERRED EMBODIMENTS

Figure 4:
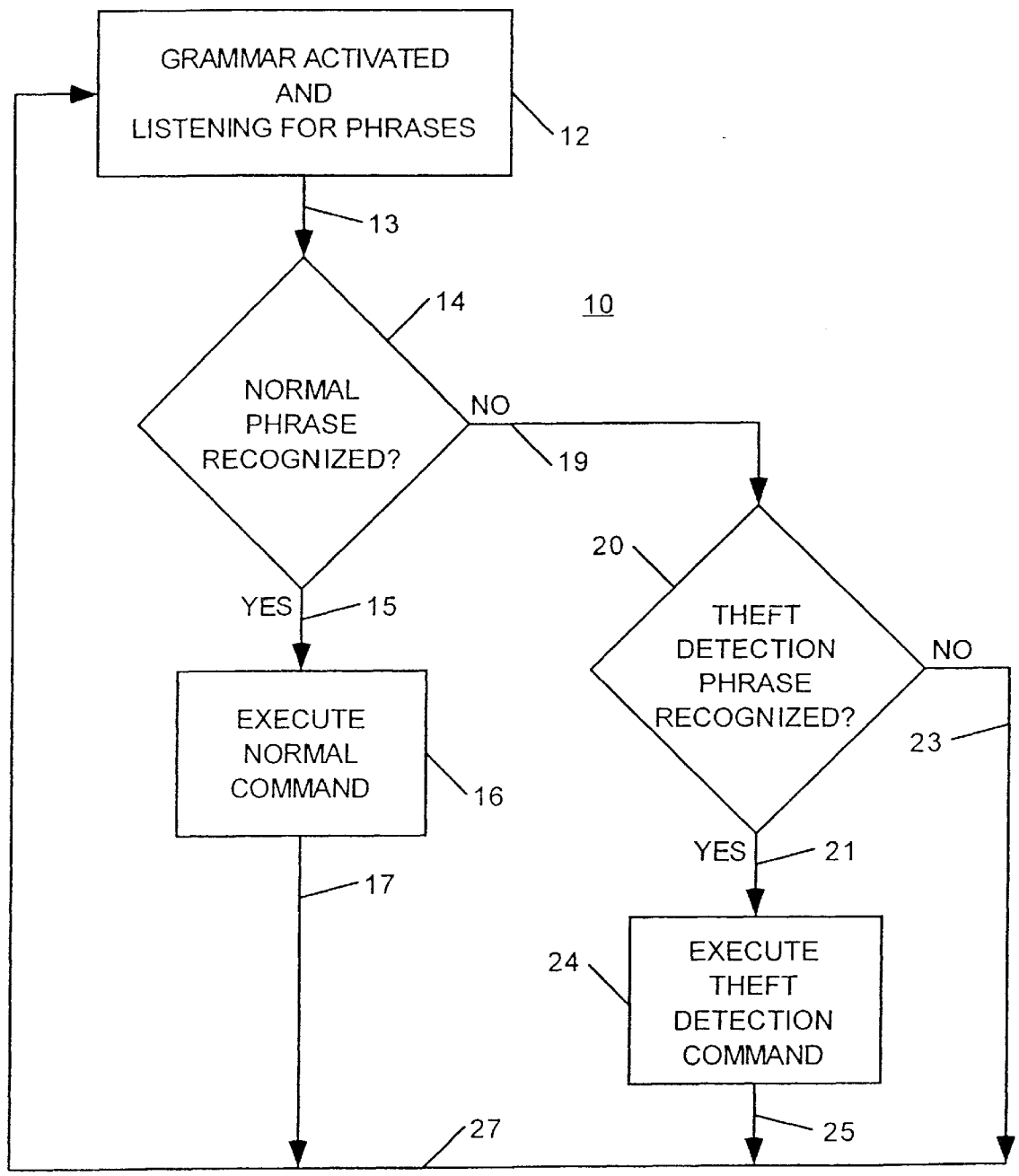
FIG. 4 is a flow chart useful for explaining the inventive arrangements.

An example of BNF grammar is shown in FIG. 1. The root points to three sentences, defined as sentence1, sentence2 and sentence3. Each sentence, as defined in FIG. 2, includes the valid phrase for the grammar following the "=" symbol and a translation rule following the "→" symbol that translates the natural command into a functional statement. In sentence, for example, the valid phrase is "PRINT THE NEXT PAGE". The corresponding translation rule is "print (page,next)". Sentence1 prints the next page in response to speech recognition of "PRINT THE NEXT PAGE". Sentence2 prints the previous page in response to recognition of "PRINT THE PREVIOUS PAGE". Sentence3 prints the previous section in response to recognition of "PRINT THE PREVIOUS SECTION".

It should be noted that translation rules are a convenience in a grammar for getting the spoken phrase into a form that backend programs can use to execute functions without requiring a separate parsing program, but are not the only way to accomplish this. Two other approaches are the use of annotations, which make parsing routines easier to write, and the use of parsing routines that work without annotations. The precise method doesn't matter insofar as the inventive arrangements are concerned. BNF code with translation rules is illustrated herein because it is the easiest and most lucrative type of grammar code to steal.

With reference to FIG. 3, a small addition to the code shown in FIG. 2 can make it easy to test a suspect grammar. As an example, consider the version of sentence1 where the "|" symbol is interpreted as the inclusive OR. A person stealing the grammar would have no reason to suspect the presence of the alternative version of sentenced. In use, no one would accidentally say the second version of sentence1, namely "I STOLE THIS GRAMMAR AND ALL I GOT WAS A LOUSY T SHIRT". In other words, although it is theoretically possible that one might accidentally utter such a phrase, the secret or test expression includes words virtually certain not to be uttered by someone not already aware of said secret expression. Any one knowing the secret expression can speak the phrase to the suspect grammar in the suspect program or application and (1) see if the phrase appears in the area of the application for recognized phrases, or if the application has no area for recognized phrases, (2) just see if speaking the phrase causes the application to perform the secret action, in this case, printing the next page. Either event would conclusively establish theft of the grammar and proof of the grammar's true origin.

The method is summarized in the flow chart 10 shown in FIG. 4. In the step of block 12 the grammar is activated and listening for spoken phrases. The method moves on path 13 to the step of decision block 14. If a normal phrase has been recognized in the step of block 14, the method branches on path 15 to the step of block 16, in accordance with which the normal command which was recognized is executed. If a normal phrase has not been recognized, the method branches on path 19 to the step of decision block 20. If a theft detection phrase has been recognized in the step of block 20, the method branches on path 21 to the step of block 24, in accordance with which the theft detection command is executed. If a theft detection phrase is not recognized in the step of block 20, the method branches on path 23.

Path 17 from block 16, path 25 from block 24 and path 23 from block 20 join to form path 27, which is the input to initial block 12. The method is repeated when the next phrase is spoken.

It will be appreciated that the order of the paths formed by blocks 14, 16 and 20,24 respectively can be interchanged. However, since the theft detection phrase will need to be recognized only sporadically, the order shown is FIG. 4 is more efficient because path 19 will rarely be used.

The inventive arrangements taught herein require virtually no additional development resources, and provide a simple yet conclusive method for determining if grammar code developed by one company has been stolen, or used in any unauthorized manner, by another company. Adding a secret test phrase to the base grammar during development, in accordance with the inventive arrangements, enables testing at a later date without any need to go below the "surface" of the suspect application.

What is claimed is:

1. A method for determining theft of grammar code, said grammar code having a plurality of natural command grammars containing representations of valid expressions for a speech-enabled computer program, comprising the steps of:

adding a valid test expression to said program, said test expression including words virtually certain not to be uttered by someone not already aware of said test expression; and, causing said program to automatically initiate a perceptible action in response to recognition of said test expression.

2. The method of claim 1, further comprising the step of uttering said test expression for recognition by a speech recognition program suspected of being a copy of said computer program.

3. The method of claim 1, wherein said action is activation of a predetermined printer function.

4. The method of claim 1, wherein said action is displaying a predetermined message on a display device.

5. The method of claim 1, wherein said action is printing a predetermined message.

6. A method for programming a grammar code for a speech-enabled computer program, comprising the steps of:

enabling a plurality of natural command grammars containing respective representations of valid expressions for said speech-enabled computer program;

providing as one of said valid expressions a plurality of ordered words virtually certain not to be uttered by someone not already aware of said plurality of ordered words; and, causing said program to automatically initiate a perceptible action in response to recognition of said plurality of ordered words.

7. The method of claim 6, wherein said action is activation of a predetermined printer function.

8. The method of claim 6, wherein said action is displaying a predetermined message on a display device.

9. The method of claim 6, wherein said action is printing a predetermined message.

10. The method of claim 6, further comprising the step of providing translation rules for said plurality of command grammars.

11. The method of claim 10, wherein speech recognition of said plurality of ordered words invokes one of said translation rules, said invoked one of said translation rules initiating said perceptible action.

* * * * *